United States Patent [19]
Morse et al.

[11] Patent Number: 5,215,339
[45] Date of Patent: Jun. 1, 1993

[54] CONDUIT COUPLING

[75] Inventors: George E. Morse, Englewood; Jon A. Johnston, Northglenn; Richard J. Rubischko, Englewood, all of Colo.

[73] Assignee: The Gates Rubber Company, Denver, Colo.

[21] Appl. No.: 840,494

[22] Filed: Feb. 24, 1992

[51] Int. Cl.$^5$ .................. F16L 33/00; F16L 47/00; F16L 49/00
[52] U.S. Cl. .................... 285/256; 285/319; 285/921
[58] Field of Search ............ 285/252, 253, 256, 257, 285/319, 360, 361, 376, 396, 921; 411/549, 550, 553

[56] References Cited

U.S. PATENT DOCUMENTS

| | | | |
|---|---|---|---|
| 1,890,348 | 12/1932 | Weatherhead, Jr. | 411/553 X |
| 4,969,667 | 11/1990 | Sauer | 285/256 |
| 4,969,668 | 11/1990 | Sauer | 285/256 |
| 4,978,149 | 12/1990 | Sauer | 285/319 X |
| 5,044,675 | 9/1991 | Sauer | 285/256 |
| 5,080,404 | 1/1992 | Sauer | 285/256 |
| 5,082,315 | 1/1992 | Sauer | 285/256 |
| 5,094,493 | 3/1992 | Sauer | 285/319 X |

Primary Examiner—Neill R. Wilson
Attorney, Agent, or Firm—Steven G. Austin; H. W. Oberg; John L. Isaac

[57] ABSTRACT

The invention is an improved fluid transport conduit coupling having a substantially tubular stem defining a central bore terminating at each end in first and second perimeter openings, a conduit insert including a body member having opposing first and second portions and adapted to receive said stem, and latching means for limiting axial movement between the stem and the conduit insert upon sealing engagement of the stem and the conduit insert. The improvement includes a latch support means disposed on the stem and at least one disengagement slot proximate the first perimeter opening, and at least one radially deflectable locking beam extending substantially axially from the first portion of the body member conduit insert. The improvement also includes the support means being engageable with the locking beam to selectively limit axial movement of the conduit insert relative to the stem upon sealing engagement thereof, with the disengagement slot permitting relative disengagement of the locking beam with the support means. The improvement further includes seal means interposed between the stem and the conduit insert for preventing fluid flow therebetween.

24 Claims, 7 Drawing Sheets

CONDUIT COUPLING

BACKGROUND OF THE INVENTION

1. Field of The Invention

This invention relates generally to couplings for joining fluid transport conduits to each other or to structures with which conduits are designed to communicate, and, more particularly, for joining polymeric hose and tubing to each other and to conduit connection devices. Specifically, the invention relates to improved conduit coupling designs with both quick connect and disconnect features.

2. Description of the Prior Art

Fluid transport conduits are used to convey and pressurize all manner of fluids in such various applications as coolant systems, hydraulic power transmission and actuation systems, pneumatic power transmission and actuation systems, gas, liquid, and solid delivery systems, sensing systems, and the like. For such conduits to be useful, a means must be provided to couple, connect or otherwise join them to each other and to other structures with which they communicate.

One such means is to use a coupling. In such an instance, one portion of the coupling is attached to an open end of a first conduit. The remaining coupling portion is attached to another conduit or structure to which the first conduit is to connect. The two coupling portions are then joined and latched to complete the connection. In order to be completely satisfactory, such couplings must exhibit adequate sealing, load and pressure resistance properties, and resistance to damage by impact.

It is frequently desirable that the joining and latching of the two portions of the coupling can be performed without the aid of tools and by simple and minimal motions on the part of the operator, i.e. the person or machine causing the joining of the coupling. An example of this is where joining and latching is effected by a single thrust of one portion upon the other portion of the coupling. Couplings with this characteristic are sometimes referred to as quick connect couplings.

Likewise, it is frequently desirable that the disjoining and unlatching can be performed with simple and minimal motion from the operator. An example of this is where unlatching is effected by a partial rotation of one portion relative to the other portion thereby allowing the two portions to disjoin. Couplings with this characteristic are sometimes referred to as quick disconnect couplings.

Prior art quick connect coupling designs have utilized many different latching arrangement. These different latching arrangements have required varying levels of motion from the operator, in terms of simplicity and number, during joining. One coupling latch requires the operator to move two or more levers which in turn operate cams which seat in depressions and latch the two portions of the coupling together. Unlatching is the reverse operation. In another latch arrangement, a two-legged pin or staple is placed in slots and grooves of the two portions of the coupling after joining to effect latching. These and other arrangements are as found in U.S. Pat. Nos. 4,894,156, Murken; 4,867,487, Phillis; 4,806,248, Murken; and 4,244,603, Stuemky.

A series of latching arrangements have utilized housings within which sets of fingers are attached extending toward the axis and interior of the conduit that grasp the other portion of the coupling. Some latches of this series make no provision for unlatching. Others of this series allow a portion of the fingers to protrude from the housing. These protrusions can be squeezed to effect unlatching.

In another latch of this series, a collar integral to the coupling can be forced between the fingers and the portion of the coupling that is grasped by the fingers, thereby spreading the fingers to unlatch.

In yet another version, the coupling has a third portion with a set of fingers, arranged as before, and a threaded end. Before the first joining and latching, the threaded end is mated to corresponding threads on the portion of its coupling connected to the first conduit. The remaining portion is attached to the structure with which the conduit is to communicate. Joining and latching is then effected by pushing this combination over the remaining portion. Disjoining and rejoining is thereafter made via the threads. Examples of all of the above can be found in U.S. Pat. Nos. 4,981,586, Bartholomew; 4,948,175, Bartholomew; 4,936,544, Bartholomew; 4,923,228, Laipply; 4,915,421, Dennany Jr.; 4,647,082, Fournier et. al. The above latching arrangement lacks quick disconnect, and quick connect after the first joining and latching operation.

In another style of quick connect coupling latching arrangement, a first portion of the coupling includes a housing with a set of radial holes and associated pins, or slots and associated rings. A collar is slidingly mounted about the housing. The remaining portion of the coupling includes a male member adapted to be inserted in the housing and includes an annular depression that fits inside the housing when the male member is inserted. In one position, the collar compresses the set of pins or rings which in turn impinge upon the male member annular depression, thereby resisting axial movement of one portion relative to the other. In another position, the collar frees the pins or rings from compression, thereby allowing disjoining of the coupling portions. Examples of this type of coupling arrangement can be found in U.S. Pat. Nos. 4,875,715; Dennany Jr. et al. and 3,537,478; Evans et al.

The previously mentioned prior art couplings and associated latching mechanisms all have a variety of drawbacks which include being overly complex to join and latch, devoid of unlatching capability, or overly complex to unlatch. Other deficiencies include having a large outside diameter as compared to the inside diameter of the associated conduits thereby being bulky, requiring excessive free space for latching and unlatching operations, being overly complex and costly to manufacture, being subject to damage or inadvertent disconnect by impact or collection of debris due to exposed portions of the latching mechanism, or being subject to a combination of these disadvantages.

In another style of quick connect coupling, one portion of the coupling includes a housing with a protrusion from one end, adapted to be inserted in the second portion of the coupling for sealing. External hooks are radially disposed around the housing. The second coupling portion includes a bore for receiving the protrusion and an annular ridge disposed thereabout. Joining and latching are apparently effected by simply thrusting the first portion upon the second. The external hooks then slide up, over and around the annular ridge, thereby restraining axial separation of the portions. This style of mechanism has the advantage of requiring the simplest of motions from the operator for joining and latching. Unjoining and unlatching are apparently effected by rotating one portion relative to the other to align the hooks with gaps in the annular ridge, and then pulling the portions apart. One disadvantage of this arrangement is that with the hooks being external to the hose as well as the coupling, they are exposed to damage from impact and debris. Moreover, the hooks are of a shape that allows items of the working environment to lodge in them, and there is apparently no provision to positively limit rotation thereby making the coupling susceptible to inadvertent disconnect. See U.S. Pat. Nos. 4,735,440, Sauer; and 4,708,375, Sauer.

In a variation of this style of coupling the gaps in the annular ridge are absent. This eliminates the inadvertent disconnect problem, but also eliminates the quick disconnect feature. Unlatching is then accomplished by prying or lifting the hooks up over the ridge. See U.S. Pat. Nos. 4,929,002, Sauer; 4,775,173, Sauer; and 4,775,172, Sauer. U.S. Pat. No. 4,775,172 also discloses extensions attached to the hooks to facilitate their lifting, and an engagement of the hooks with the annular ridge that apparently provides only partial latching. Apparently, if enough force is applied to separate the portions, the latch releases. This style apparently suffers the additional disadvantage of being bulky.

In yet another style of quick connect couplings, a first portion of the coupling includes a housing with a bore adapted to receive a protrusion from a second coupling portion, with hooks around the receiving perimeter of the bore extending from under the open end of the conduit. The second portion includes the protrusion which, sealingly engages the bore, and an annular ridge for receiving and engaging the hooks. The engagement, of the hooks and the ridge, latches the two coupling portions. This style also joins and latches with a single thrust. However, unlatching requires prying hooks away from the ridge. Further, by employing hooks over a ridge, the strength of materials used must be adequate to overcome the inherent weaknesses imposed upon the design where curved members are under compression. This style enjoys the benefit of presenting a small overall diameter for a given hose outside diameter, as compared to other coupling designs, and is sometimes known as a low profile coupling. See U.S. Pat. Nos. 5,044,675, Sauer; 4,978,149, Sauer; 4,969,669, Sauer; 4,969,667, Sauer.

In still another prior quick connect coupling style, a first portion of the coupling includes a cylindrical, circumferentially complete body member adapted to be inserted into and sealingly connected with the open end portion of a hose. The portion of the body member, that extends the deepest into the hose interior, includes an upset bead. A set of prongs extends from this body member upset bead toward the interior axis of the hose. A bore runs through the first portion. The second coupling portion includes a cylindrical projection adapted to be inserted in the bore of the first portion, with an annular ridge for receiving the prongs.

In this coupling style as well as all the other coupling designs discussed above, a sealing mechanism is interposed between the two separated coupling portions prior to their being joined together. Without such sealing mechanism, the couplings would not remain leakproof over time.

Joining and latching is accomplished by a single thrusting of the two portions upon each other, causing the prongs to seat behind and engage the annular ridge. However, since both portions are cylindrical, particularly the second portion, as opposed to frustoconical, there is substantial sliding of the two portions relative to each other before latching occurs. This substantial sliding provides an opportunity for an excessive force requirement to join and latch, due to binding of the two portions, and excessive wear of the sealing means.

This style of coupling does not have quick disconnect capability. Unlatching is effected by first separating the hose from the first portion, then prying the prongs away from the annular ridge. The coupling portions can then be disjoined. However, it does have a low profile, and is not susceptible to damage or inadvertent disconnect because the latching mechanism (i.e., prongs and annular ridge) is internal to the hose.

On the whole, this style of coupling can be used in spaces with minimum surrounding free space and where tools or debris might contact it, but it is apparently not well suited for repeated connect/disconnect operations.

The hose coupling that allows simple thrusting of one portion upon the other to effect joining and latching reduces the cost of assembling fluid transport conduit systems. Where quick connect/disconnect can be effected with minimal force, repeatably and reliably also tends to reduce manufacturing and maintenance costs. Couplings that also feature quick disconnect reduce maintenance costs. Couplings that are not subject to inadvertent disconnect and are resistant to damage from impact or debris reduce the frequency of breakdown. Reducing the number and complexity of the parts that make up a coupling, reduces the cost of manufacture of the coupling.

Consequently a need exists for a coupling that combines the characteristics of: requiring minimal operator motion and force for connection and disconnection; being resistant to inadvertent disconnect; being resistant to damage by impact or debris; requiring minimum free space around the coupling to operate the latch; having a low profile allowing the coupling to fit in limited space applications; and is inexpensive to manufacture because of simplicity, minimal number, and inherent design strength of constituent parts.

SUMMARY OF THE INVENTION

Accordingly, the subject invention has as an object the provision of a conduit coupling construction which, at once, allows minimum operator motion and force to effect both connection and disconnection, is reliable and repeatable in its connection/disconnection properties, is resistant to inadvertent disconnect and damage by impact or debris, has a low profile, and is inexpensive to manufacture.

Another object of the subject invention is to provide an improved conduit coupling device to satisfy the coupling needs where fluid transport conduits are used.

An improved fluid transport conduit coupling having a substantially tubular stem defining a central bore terminating at each end in first and second perimeter openings, a conduit insert including a body member having opposing first and second portions and adapted to receive said stem, and latching means for limiting axial movement between the stem and the conduit insert upon sealing engagement of the stem and the conduit insert is disclosed. The improvement includes a latch support means disposed on the stem and at least one disengagement slot proximate the first perimeter opening, and at least one radially deflectable locking beam extending substantially axially from the first portion of the body member conduit insert. The improvement also includes the support means being engageable with the locking beam to selectively limit axial movement of the conduit insert relative to the stem upon sealing engagement thereof, with the disengagement slot permitting relative disengagement of the locking beam with the support means. The improvement further includes seal means interposed between the stem and the conduit insert for preventing fluid flow therebetween.

BRIEF DESCRIPTION OF THE DRAWINGS

The accompanying drawings, which are incorporated in and form a part of the specification and in which like numerals designate like parts, illustrate preferred embodiments of the present invention and together with the description, serve to explain the principles of the invention. In the drawings.

DETAILED DESCRIPTION OF THE PREFERRED EMBODIMENTS

Figure 1:
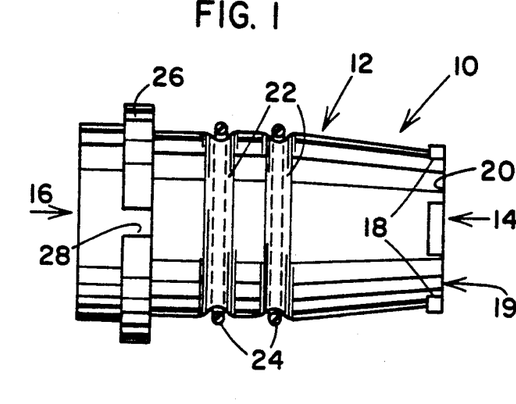
FIG. 1 is a side elevation view of one embodiment of the stem portion of the present invention with seals in place.
Figure 2:
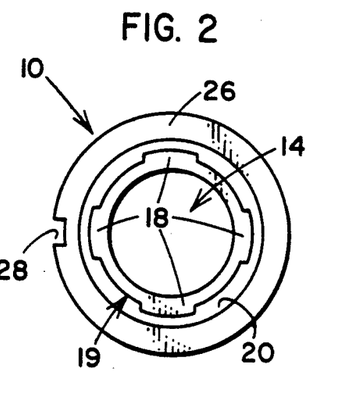
FIG 2 is an end view of the stem depicted in FIG. 1.

Referring to the drawings and particularly the FIGS. 1-8 there is shown a preferred embodiment of a conduit coupling. FIGS. 1 and 2 show a coupling stem 10, which includes a partially frustoconical body 12 having a first end opening 14 and a second end opening 16. A plurality of spaced latch supports 18 are disposed along the edge 19 of the end opening 14 which define slots 20 therebetween. A pair of annular depressions 22 are disposed along the mid-portion of the body 12, and a fluid flow preventing mechanism preferably in the form of O-ring seals 24 are positioned in the depressions 22. An annular flange 26 is disposed about the stem 12 proximate the end opening 16 and includes a gap 28 therein.

Figure 1A:
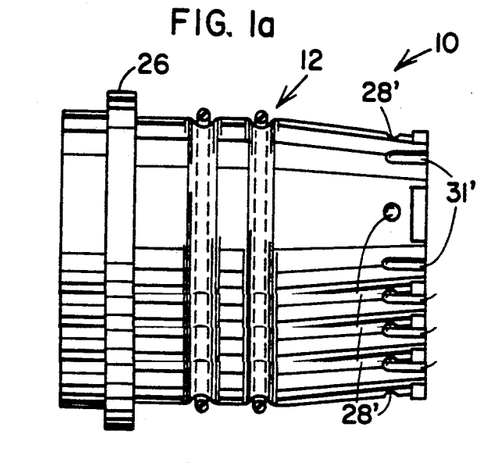
FIG. 1a is a side elevation view of another embodiment of the stem portion of the present invention with seals in place.
Figure 2A:
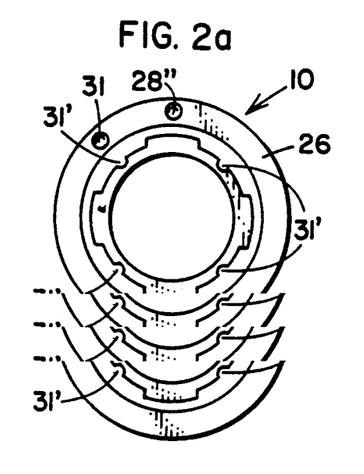
FIG. 2a is an end view of another embodiment of the stem.
Figure 3:
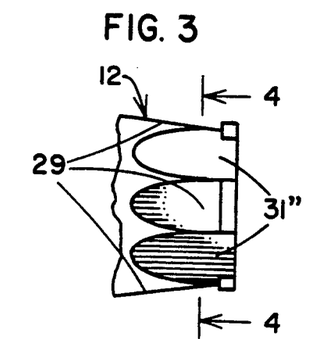
FIG. 3 is a partial side elevation similar to FIG. 1 but showing an alternate dimpling embodiment.
Figure 4:
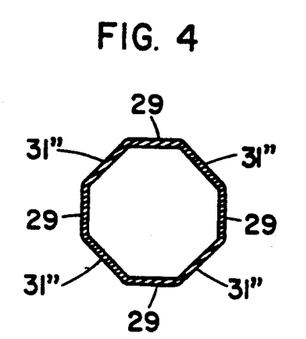
FIG. 4 is a cross-sectional view taken substantially along line 4—4 of FIG. 3.

A first functional alternative to the gap 28 is the body dimples 28' disposed upon the body 12, as depicted in FIG. 1a and as further described below. A second functional alternative to the gap 28 is the abutment dimple 28" disposed upon abutment 26, as depicted in FIG. 2a. A third functional alternative to the gap 28 includes the body flats 29 disposed about the body 12, as depicted in FIGS. 3 and 4 and as also described below.

Figure 5:
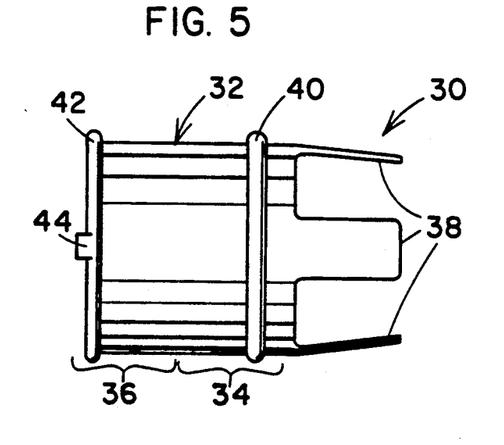
FIG. 5 is a side elevation view of one embodiment of a conduit insert portion of the present invention.
Figure 5A:
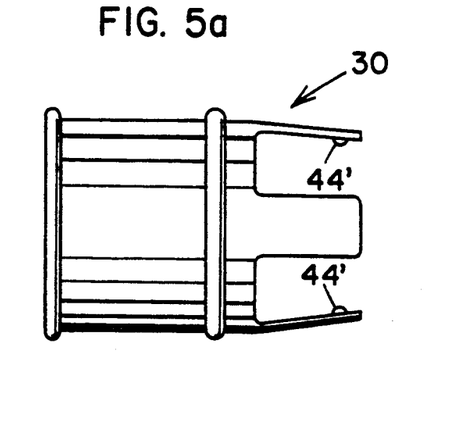
FIG. 5a is a side elevation view of yet a third embodiment of the conduit insert portion of the present invention.
Figure 5B:
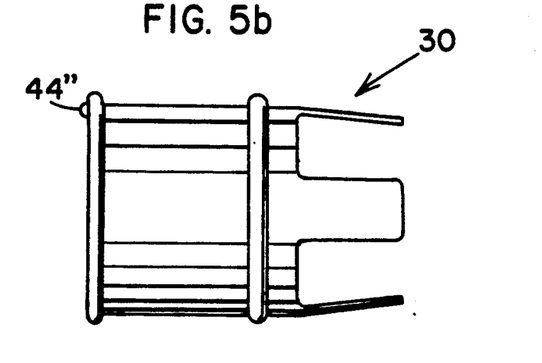
FIG. 5b is a side elevation view of another embodiment of the conduit insert portion of the present invention.
Figure 6:
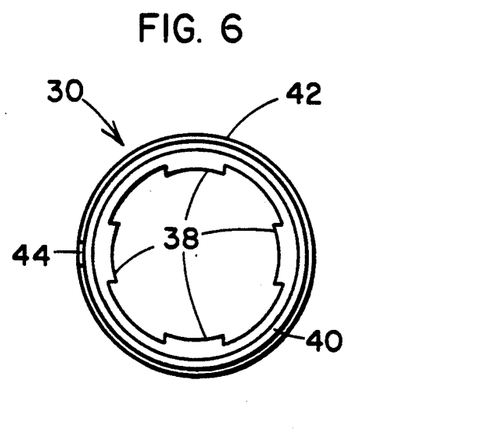
FIG. 6 is an end view of the conduit insert portion depicted in FIG. 5.
Figure 6A:
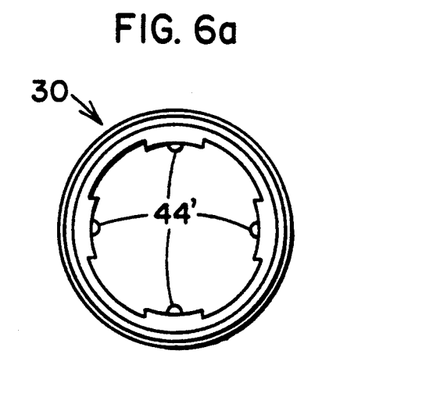
FIG. 6a is an end view of the conduit insert portion depicted in FIG. 6.

FIGS. 5 and 6 show a conduit insert 30, which includes a body member 32 having a first body member portion 34 disposed at one end and a second body member portion 36 extending from the first body member portion 34 to the other end. Radially deflectable locking beams 38 extend axially from an upset bead 40, which is radially disposed about the first body member portion 34. A flange 42 and a tab 44 extend radially from the open end of second body member portion 36. A first functional alternative to the tab 44 includes the beam bumps 44' projecting from the interior of its locking beams 38, as depicted in FIG. 5a and described in detail below. A second functional alternative includes the flange bump 44" projecting from the flange 44, as depicted in FIG. 5b.

Figure 8:
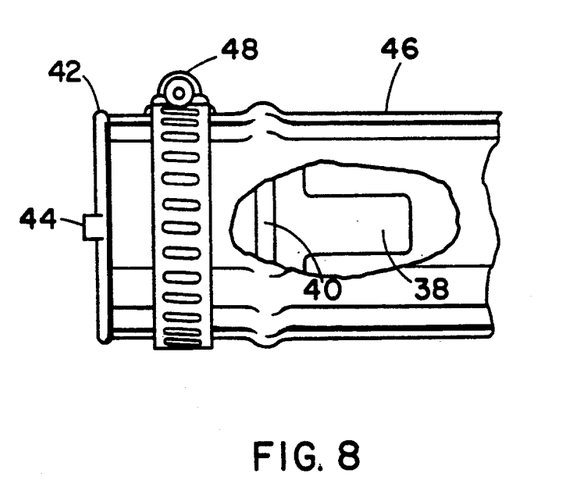
FIG. 8 is a side elevation view with a cutaway depicting yet another embodiment of a conduit insert portion of the present invention and affixed to an end of a fluid transport conduit.

FIG. 8 shows the conduit insert 30 of FIG. 5, radially disposed within or inserted in the open end of fluid transport conduit or hose 46. The insert 30 is maintained in position relative to the hose 46 by use of a hose clamp 48.

Figure 7:
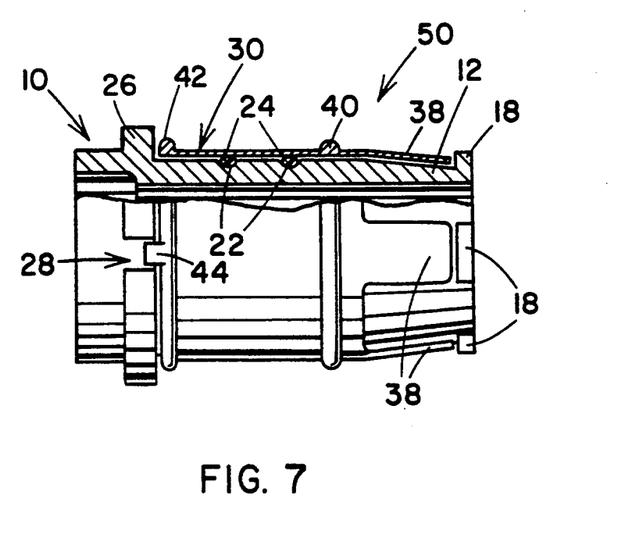
FIG. 7 is a side elevation view with a cutaway portion depicting one complete embodiment of the invention wherein the portions of FIGS. 1 and 5 are illustrated in interacting position.

Now referring particularly to FIGS. 7 and 8, in practice the conduit insert 30 is pushed into the open end of the hose 46. The hose clamp 48 is then tightened about the hose 46 and the conduit insert 30 so that, with the aid of the upset bead 40 and the flange 42, the insert 30 is fixed in place, both rotationally and axially, and a fluid-tight seal is formed between the insert 30 and the hose 46. Although a specific type of ratcheting clamp well known in the hose industry is depicted, any type of clamp that provides adequate clamping force is contemplated for use with the invention.

Next, the operator, i.e. the person or machine responsible for connecting the hose 46 with whatever work piece the hose 46 is to communicate, simply thrusts the assembly of the hose 46 and insert 30 over the stem 10 of FIG. 1, being sure to complete the proper alignment by aligning the tab 44 within the gap 28. The partial frustoconical shape of the stem body 12 and associated adaptation of the shape of the insert 30 enables reduced sliding of the insert 30 over the surface of the body 12 and the O-rings 24. This reduces both the force required of the operator to effect joining and latching as well as the wear imposed upon the surfaces of these components.

The coupling 50 is now complete, as depicted in FIG. 7, with the abutting relationship of the abutment 26 and the flange 42 limiting further axial travel in one direction. The abutting relationship between the supports 18 and the locking beams 38 forms the latch that limits axial travel in the opposite direction that would separate or disjoin the insert 30 from the stem 10. The completed alignment mechanism between the tab 44 and the gap 28, limits rotation of the insert 30 relative to the stem 10.

In alternative embodiments, the completed alignment mechanism may include the flange bump 44" of FIG. 5b aligned with the abutment dimple 28" of FIG. 2a, respectively, or the beam bump 44' of FIG. 5a aligned with the body dimple 28' of FIG. 1a or the locking beam 38 of FIG. 3 aligned with the flat 29 as shown in FIG. 4, or any combination of the embodiments. For any of these three cases, the alternate completed alignment mechanism limits rotation of the insert 30 relative to the stem 10.

The O-ring seals 22 limit fluid flow that would otherwise occur between the surfaces of the stem 10 and the insert 30.

Referring to FIGS. 1, 2, 5 and 7 to unlatch and disjoin the coupling 50, the tab 44 is axially moved out of the gap 28 to allow the insert 30 to rotate upon the stem 10. The insert 30 is then rotated to align the locking beams 38 with the slots 20. The insert 30 is then pulled axially off the stem 10.

For the alternative embodiments where the alignment mechanism includes the body dimples 28' in combination with the beam bumps 44', the abutment dimples 28" in combination with the flange bump 44", the body flats 29 in combination with the locking beams 38, or more than one of the above, unlatching and disjoining is effected by applying enough rotational force to the insert 30 relative to the stem 10 to dislodge the combination of the selected alternative alignment means. Rotation then continues to align the locking beams 38 with the slots 20, and the insert 30 and the stem 10 are then separated.

Additionally, a disconnect alignment mechanism may be provided to aid the operator in aligning the beam 38 with the slots 20. In one embodiment, a disconnect alignment dimple 31 positioned on the abutment 26 (FIG. 2a) is aligned for mating with the flange bump 44" of FIG. 5b. In another embodiment, a disconnect alignment slot 31' (FIGS. 1a and 2a) is aligned for mating with the beam bump 44' of FIG. 5a. In yet a third embodiment, a disconnect alignment flat 31" (FIGS. 3 and 4) is aligned to engagement with the beam 38. These disconnect alignment mechanisms give feedback to the operator that alignment of the beam 38 with the slots 20 has occurred.

The tab 44 can be made of an inexpensive material which does not allow repeated movement, such as to work harden. Thus only few or even only one coupling-/decoupling operation can be performed before replacement of the insert 30 is necessary. In alternate form, the material of the tab 44 can be very malleable or can be springy to allow multiple connecting/disconnecting operations. Further, the tab 44 may include an extension (not illustrated) to permit access to the tab 44 without the aid of tools for ease of unlatching.

Each of the alignment mechanisms discussed above can utilize an appropriate number of tabs 44 with gaps 28; dimples 28' with bumps 44'; dimples 28" with bumps 44"; or flats 29 with beams 38; to provide any desired number of alignment positions, not just the single alignment positions illustrated. In addition, placement of all tabs, alignment dimples, bumps, and slots can be reversed as to their placement on the stem 10 and the insert 30. Moreover, for those applications where alignment is not desirable, the coupling 50 can be devoid of any alignment mechanism.

Referring now to FIGS. 7 and 8, the flange 42 limits the travel of the insert 30 into the hose 46 and simplifies the assembly thereof. However, an embodiment without a flange 42 is also envisioned, and the abutment 26 may also be absent. For example, in those applications where the coupling 50 is continuously under stress tending to disconnect the coupling 50, the abutment 26 would serve only a redundant function and therefore would be unnecessary.

While the upset bead 40 aids in retaining the integrity of the assembly of the insert 30 and the hose 46, some applications may not require the upset bead 40. For other applications, an upset bead 40, with the rounded cross section shown, may not be adequate. Cross sections such as a barbed, squared, triangulated shape or the like, that produce adequate holding power for a given application are contemplated. Moreover, a plurality of upset beads 40 may be utilized.

The beams 38 can be of any number and any size that allows them to pass through the slots 20 for unlatching. Likewise, the supports 18 and the slots 20 are of any number and size to act upon the beams 38 to selectively latch and unlatch the coupling 50.

Figure 9:
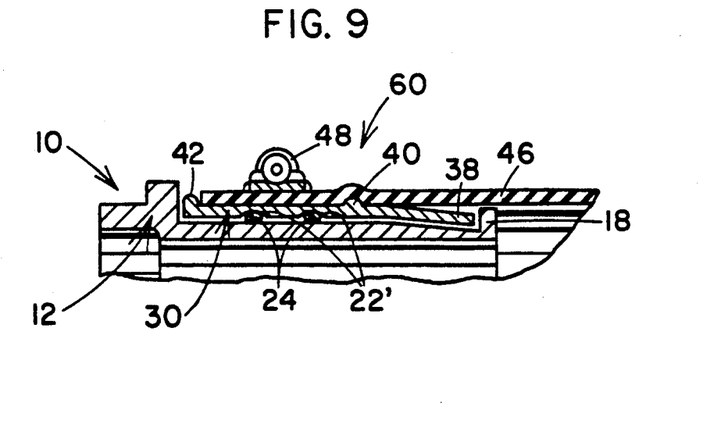
FIG. 9 is a side sectional view of the invention detailing one embodiment of a fluid flow limiting mechanism of the invention.

FIG. 9 shows another embodiment of the coupling 60 in partial section. The significant differences in this coupling 60 from the coupling 50 of FIG. 7 are in the deletion of the annular depression 22 from the stem 10 and in the addition of annular interior depressions 22' in conduit insert 30. This results in different placement of the O-ring seals 24. This embodiment is an alteration of the fluid flow preventing mechanism.

Figure 10:
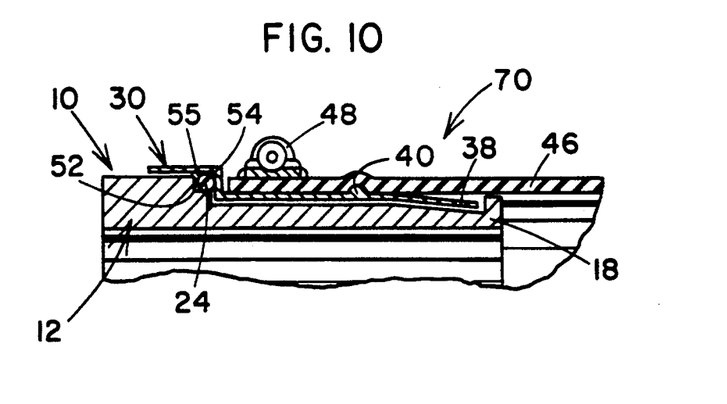
FIG. 10 is a side sectional view of the invention detailing another embodiment of a fluid flow limiting mechanism of the invention.

FIG. 10 illustrates another coupling embodiment 70 with another alteration of the fluid flow preventing mechanism. In the previous embodiments of the coupling 50 and the coupling 60, the depressions 22 and 22', respectively, contained the O-ring seals 24 nested within either the stem 10 or the insert 30, respectively. In this embodiment, the function of containing the O-ring seals 24 is shared between the stem 10 and the insert 30. An annular notch 52 is created in the stem 10 and an annular extension 54 of the insert 30 overlays the notch 52 to provide an annular channel 55 in which the O-ring seal 24 is positioned.

Figure 11:
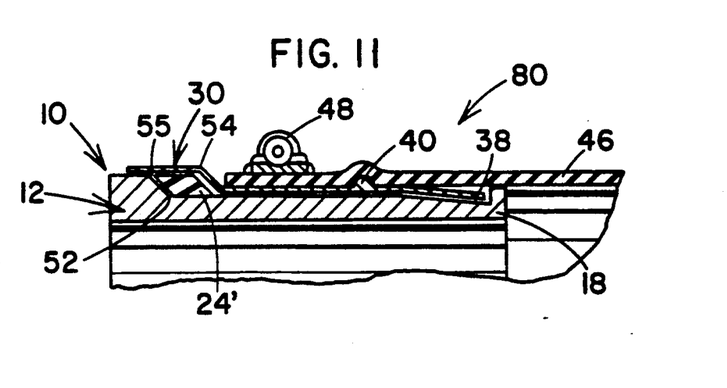
FIG. 11 is a side sectional view detailing still another embodiment of a fluid flow limiting mechanism of the invention.

FIG. 11 shows yet another embodiment of the coupling 80 with yet another alteration of the fluid flow preventing means. This embodiment differs from that of FIG. 10 in that the cross sectional shape of fluid flow preventing means or the O-ring 24', is a parallelogram, and the channel 55 is sized and shaped accordingly. Any polygonal or irregular cross section shape also may be employed.

It is also contemplated that the fluid flow preventing means be provided by the mating of surfaces of the stem 10 and the insert 30 without additional members, for some applications.

Figure 12:
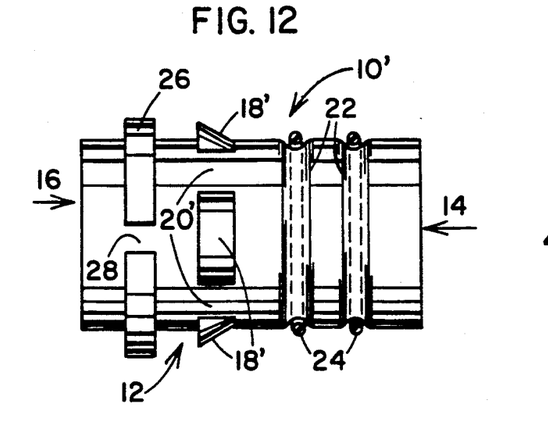
FIG. 12 is a side elevation view of another embodiment of the stem portion of the present invention with the seals in place.
Figure 12A:
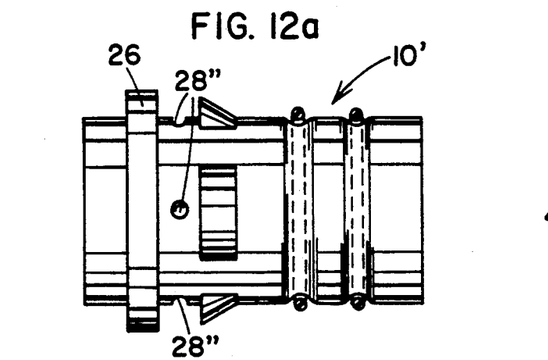
FIG. 12a is a side elevation view of another embodiment of the stem portion of the present invention with the seals in place.
Figure 12B:
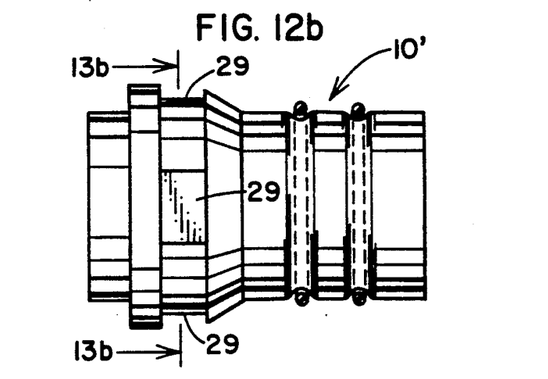
FIG. 12b is a side elevation view of still another embodiment of the stem portion of the present invention with the seals in place.
Figure 13:
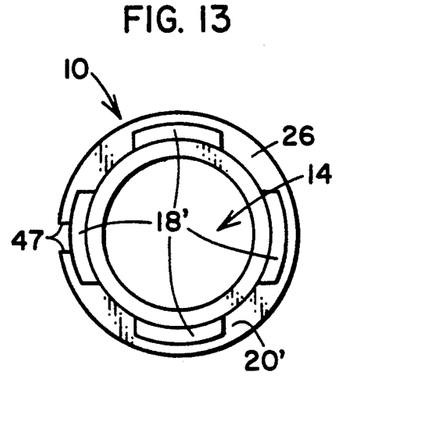
FIG. 13 is an end view of the embodiment depicted in FIG. 12.
Figure 13A:
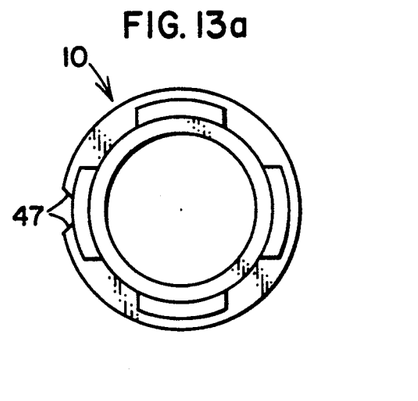
FIG. 13a is an end view similar to FIG. 13 illustrating a variation thereof.
Figure 13B:
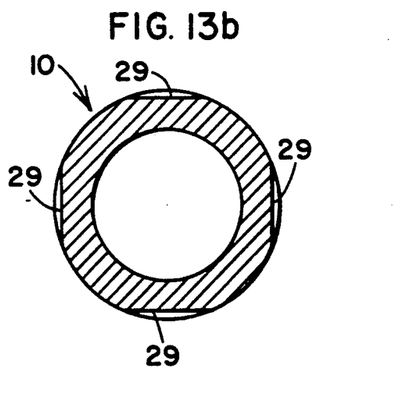
FIG. 13b is a cross-sectional view taken substantially along the line 13b—13b of FIG. 12b.
Figure 14:
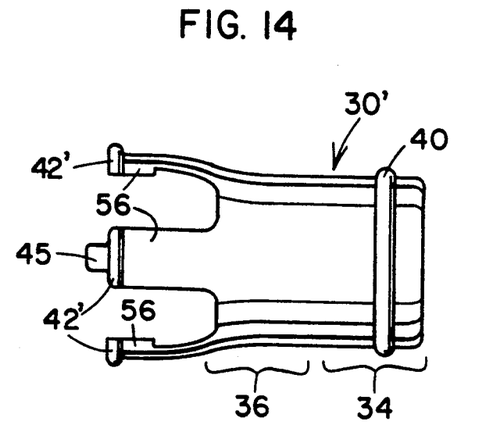
FIG. 14 is a side elevation view of another embodiment of the conduit insert portion of the present invention.
Figure 14A:
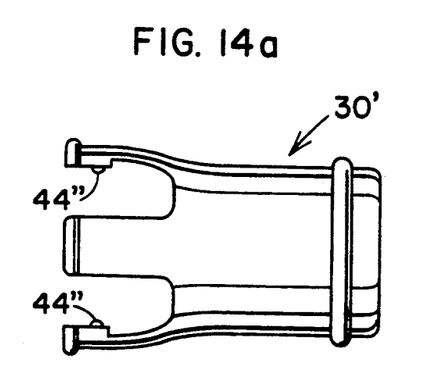
FIG. 14a is a side elevation view of yet another embodiment of the conduit insert portion of the present invention.
Figure 15:
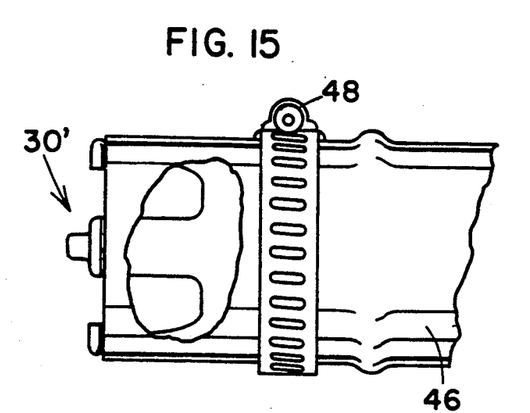
FIG. 15 is a side elevation view, partially cut away, illustrating the embodiment of FIG. 13 placed in and affixed to an end of a fluid transport conduit.

FIGS. 12-15 depict yet another embodiment of the stem 10' and the conduit insert 30'. Here supports 18' are moved from near the perimeter opening 14 to mid-region of the tubular body 12. The locking beams 38 of the prior embodiments are replaced with locking beams 56 which are hook shaped and extend axially from the second body member portion 36. A tongue 45 extends from one or more of the beams 56. When the opposite facing sides 47 of the gap 28 are parallel, in the manner shown in FIG. 13, the tongue 45 must be lifted to allow rotation of the stem 30' to effect unlatching. However, as depicted in FIG. 13a, the sides 47 can also be slanted to form the top section of a "V" with the point toward the axis of the stem 10'. When so formed, rotational force upon the insert 30' can provide the lifting of the tab 45, leading to unlatching. The alignment mechanism including body dimples 28" (FIG. 12a) with the beam bump 44" (FIG. 14a) or the flats 29 (FIGS. 12b and 13b) with the beams 38 (FIG. 5) can also be used in this embodiment. The tongue 45 can also be of any size and shape that facilitates access to it.

In practice, the coupling including the stem 10' and the insert 30' is assembled onto a hose 46, connected and disconnected in the same manner as in the previous embodiments, and exhibits essentially the same characteristics and advantages as the embodiment of the coupling 50. The discussion of variations of the elements of the previously mentioned embodiments applies to this embodiment equally.

Figure 16:
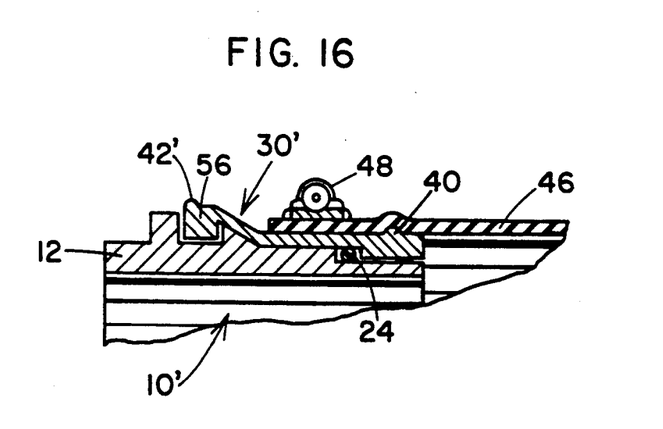
FIG. 16 is a partial side sectional view detailing the same fluid flow limiting mechanism embodiment as depicted in FIG. 9, but as applied to the conduit coupling embodiment of FIGS. 12-15.

FIG. 16 demonstrates the applicability of the fluid flow limiting mechanism of FIG. 11 adapted to the embodiment of the stem 10' and the insert 30'.

As can be seen from the above, the present invention incorporates a wide variety of combined advantages. The invention enables minimum operator motion and force for connection and disconnection by the action of the latching mechanism, yet promotes reduced wear upon mating surfaces when repeatedly connected and disconnected. The coupling of the invention is resistant to inadvertent disconnect due to the effects of the alignment mechanism and is resistant to damage by impact or debris because the latching mechanism is internal to the latched hose. The invention also requires minimum free space around the coupling to operate the latch because of the absence of external levers. Finally, the coupling of the invention has a low profile and is inexpensive to manufacture because of simplicity, minimal number, and inherent design strength of constituent parts.

The foregoing description and the illustrative embodiments of the present invention have been shown in the drawings and described in detail in varying modifications and alternate embodiments. It should be understood, however, that the foregoing description of the invention is exemplary only, and that the scope of the invention is to be limited only to the claims as interpreted in view of the prior art. Moreover, the invention illustratively disclosed herein suitably may be practice in the absence of any element which is not specifically disclosed herein.

What is claimed is:

1. A fluid transport conduit coupling having a substantially tubular stem defining a central bore terminating at each end in first and second perimeter openings, a conduit insert including a body member having opposing first and second portions and adapted to receive said stem, and latching means for limiting axial movement between said stem and said conduit insert upon sealing engagement of said stem and said conduit insert, wherein the improvement comprises:

latch support means disposed on said stem and defining at least one disengagement slot proximate said first perimeter opening;
   at least one radially deflectable locking beam extending substantially axially from the first portion of said body member conduit insert;
   said support means being engageable with said locking beam to selectively limit axial movement of said conduit insert relative to said stem upon sealing engagement thereof, said disengagement slot permitting relative disengagement of said locking beam with said support means upon rotation of said stem relative to said conduit insert; and
   seal means interposed between said stem and said conduit insert for preventing fluid flow therebetween.

2. The improvement of claim 1, wherein said stem comprises a cylindrical portion disposed proximate said second perimeter opening and a frustoconical portion extending axially between said cylindrical portion and said first perimeter opening.

3. The improvement of claim 1, wherein said stem further defines at least one annular depression sized and shaped to received said seal means.

4. The improvement of claim 1, wherein said conduit insert further defines at least one annular interior depression sized and shaped to receive said seal means.

5. The improvement of claim 1, further comprising means interposed between said stem and said conduit insert for selectively limiting rotational movement of said stem relative to said conduit insert.

6. The improvement of claim 5, wherein said rotation limiting means comprises at least one projection and at least one seat for said projection interposed between said stem and conduit insert and adapted for interengagement when said latch support means and said locking beam are in axial movement limiting engagement.

7. The improvement of claim 6, wherein said projection comprises a bump and said seat comprises a dimple adapted to receive said bump.

8. The improvement of claim 6, wherein said rotation limiting means comprises an annular member in the form of an abutment aligned proximate said second perimeter opening, and wherein seat is in the form of a slot disposed in said annular member, and said projection comprises a tab extending radially from the second portion of said conduit insert body member, said tab being adapted for insertion in said slot to selectively limit rotational movement of said conduit insert relative to said stem.

9. The improvement of claim 8, wherein said tab is deformable to selectively limit rotational movement of said conduit insert relative to said stem.

10. A conduit coupling device adapted to sealingly join at least one fluid transport conduit comprising:
- a stem defining a central bore terminating at each end in first and second perimeter openings, and including at least one latch support defining at least one disengagement slot proximate said first perimeter opening;
- a conduit insert including a body member sized and shaped to be positioned radially about said stem and having opposing first and second portions, and at least one elongated radially deflectable locking beam extending substantially axially from said body member first portion, said locking beam being adapted to selectively engage said latch support and disengagement slot in a manner to selectively limit axial movement of said conduit insert relative to said stem upon rotation of said conduit insert relative to said stem;
- said conduit insert being sized and shaped for disposition within an open end of a fluid transport conduit in a manner to position said first portion interior of said second portion; and
- means interposed between said stem and said conduit insert for preventing fluid flow therebetween.

11. The device of claim 10, wherein said stem further comprises a cylindrical portion and a frustoconical portion extending axially therefrom, the terminal end of said cylindrical position defining said second perimeter opening, and the terminal end of said frustoconical portion defining said first perimeter opening.

12. The device of claim 10, wherein said stem further comprises an abutment disposed proximate said second perimeter opening to limit movement of said conduit insert axially in a direction opposite to axial the limitation provided by said locking beam and latch support engagement.

13. The device of claim 10, wherein said stem further comprises at least one annular depression sized and shaped to receive said fluid flow preventing means.

14. The device of claim 10, wherein said conduit insert further comprises at least one annular interior depression sized and shaped to receive said fluid flow preventing means.

15. The device of claim 10, further comprising means interposed between said stem and said conduit insert for selectively limiting rotational movement of said stem relative to said conduit insert.

16. The device of claim 15, wherein said rotational limiting means substantially limits said rotation in at least one position thereof, when said support and said locking beam are in axial movement limiting engagement.

17. The device of claim 16, wherein said rotation limiting means comprises at least one projection and at least one seat for said projection interposed between said stem and said conduit insert and adapted for interengagement when said latch support means and said locking beam are in axial movement limiting engagement.

18. The device of claim 17, wherein said projection comprises a bump and said seat comprises a dimple adapted to receive said bump.

19. The device of claim 17, wherein said rotation limiting means comprises an annular member in the form of an abutment disposed proximate said second perimeter opening, and wherein said seat is in the form of a slot disposed in said annular member, and said projection comprises a tab extending radially from the second portion of said conduit insert body member, said tab being adapted for insertion in said slot to selectively limit rotational movement of said conduit insert relative to said stem.

20. The device of claim 19, wherein said tab is deformable to selectively limit rotational movement of said conduit insert relative to said stem.

21. The device of claim 10, wherein said conduit insert further comprises a flange extending radially from said body member second portion to limit axial movement of said conduit insert within a fluid transport conduit.

22. The device of claim 10, wherein said stem defines a first annular channel in the outer surface thereof, said conduit insert defines a second annular channel in the inner surface thereof, and said fluid flow preventing means includes a sealing member, said first and second annular channels acting in concert to confine said fluid flow sealing member when said conduit insert is disposed about said stem and said locking beam is in axial limiting engagement with said supports.

23. The device of claim 22, wherein said fluid flow sealing member comprises an O-ring.

24. The device of claim 22, wherein said fluid flow sealing member comprises an annulus with a generally polygonal cross section.

* * * * *